Sept. 10, 1968 C. E. PHILLIPS 3,400,804
CONTINUOUS BELT CONVEYOR FOR UNLOADING GRANULAR
MATERIAL FROM HOPPERS
Filed April 5, 1967 2 Sheets-Sheet 1
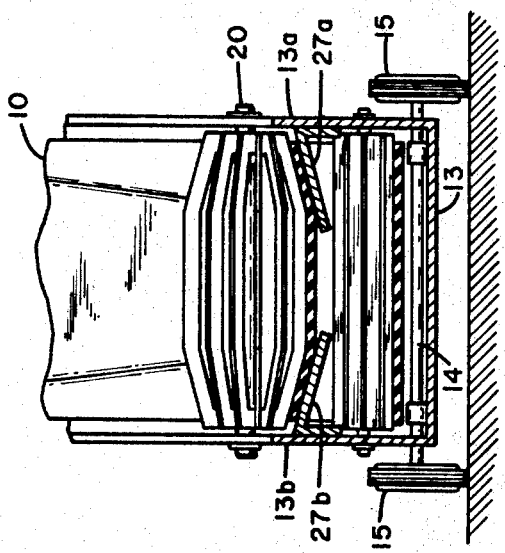
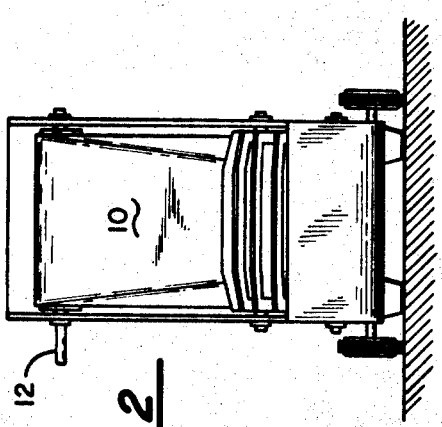
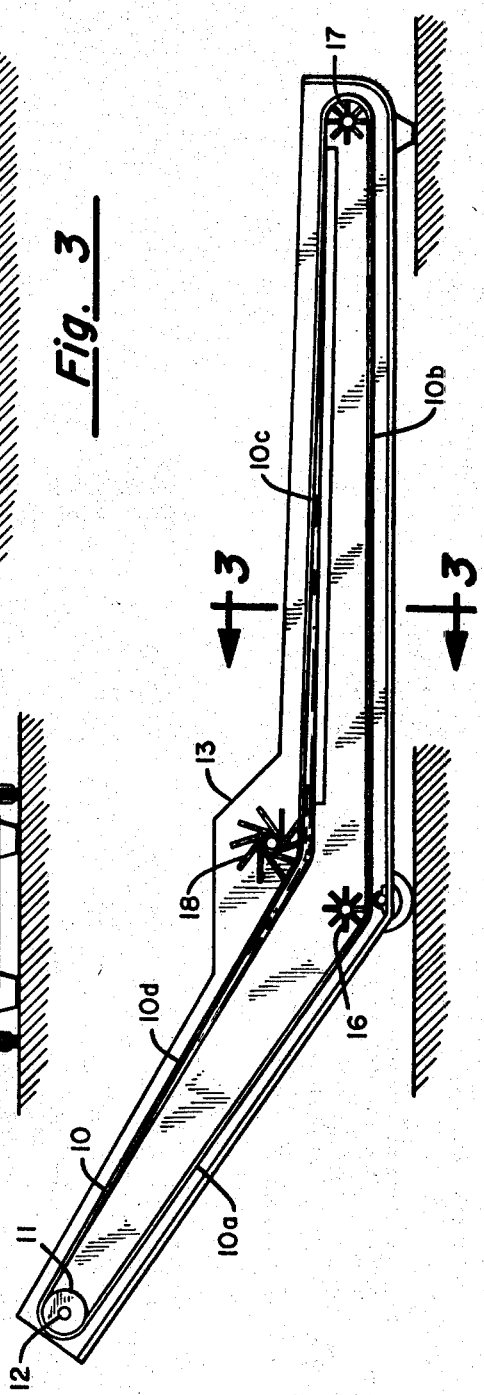
INVENTOR
CHARLES E. PHILLIPS
BY Stryker and Jacobson
ATTORNEYS

INVENTOR
CHARLES E. PHILLIPS

United States Patent Office 3,400,804
Patented Sept. 10, 1968

3,400,804
CONTINUOUS BELT CONVEYOR FOR UNLOADING GRANULAR MATERIAL FROM HOPPERS
Charles E. Phillips, Box 65, Downsville, Wis. 54735
Filed Apr. 5, 1967, Ser. No. 628,619
7 Claims. (Cl. 198—53)

ABSTRACT OF THE DISCLOSURE

An endless belt made of somewhat flexible material has a low lying horizontal section which can be located under a hopper for receiving discharged granular material and an upwardly inclined section by which the granular material is elevated for disposal in a storage bin or a truck or other receptacle. The belt is formed into horizontal and inclined portions by suitably located pulleys. A bladed rotor is located above the conveyor belt at a strategic location to assist in impelling the granular material up the inclined portion of the belt. The blades are constructed in a manner such that they press downward onto the belt to form it into a trough shape and also have suitable openings through which the granular material can pass to prevent a build-up or packing of the granular material between successive blades.

BACKGROUND OF THE INVENTION

Field of the invention

This invention is directed toward improvements in conveyor belt systems for unloading granular material from a container which discharges the material out a bottom opening such as a railroad grain car, and for elevating discharged material to a suitable height to be deposited in some other type of container.

Description of the prior art

There are a number of devices which have been described and proposed for use for this same function and constructed in a somewhat similar fashion. In most, if not all, of these earlier devices, the conveyor belt was a two-piece construction which caused some difficulties in transferring the granular material from one section to the other. One problem was the loss of the material due to it dropping on the ground. Another difficulty experienced by the prior art devices was loss of material by it dropping off along the sides of the conveyor belt. To prevent this, the side walls of the supporting frame were built up but this, in turn, merely led to an accumulation of the material along the sides until the machine would jam or the belt would wear quickly. In prior art devices which used a type of paddle wheel or the like to help push the granular material up the inclined portion of the belt, difficulties were often encountered because of the accumulative build up of material between successive paddle blades until either the rotating shaft would jam or the belt would be forced downward, thereby effectively reducing speed of the belt and the volume of material being conveyed away from the hopper. In addition, the prior art devices, as the paddle wheel blades rotated through the granular material and lifted out of the layer of material, they usually threw a significant amount of the material upward and outward away from the unloader which was bothersome and costly.

SUMMARY

The unloader comprises a flexible continuous belt having a horizontal portion for receiving discharged material out the bottom of a hopper and an upwardly inclined portion for elevating the material to a desired level. Being a continuous belt, waste of material is minimized and furthermore, the material is conveyed at a greater velocity so that when it reaches the top end of the unloader it can be propelled a good distance away from the belt into a suitably located receptacle. A vaned or bladed pulley or rotor strategically located above the belt not only helps direct the belt to an incline from the horizontal, but further is constructed in a manner to shape the belt into somewhat of a trough form and assist in impelling the material up the inclined portion of the unloader. The blades are constructed with openings to allow some of the granular material to pass through the blades so that it does not build up between adjacent blades. A further construction feature resides in the manner the blades are attached to the rotor shaft to minimize waste due to excessive propelling of the material as the edge of the blade lifts out of the granular material.

DESCRIPTION OF PREFERRED EMBODIMENT

Advantages and features of this invention will become apparent during the course of the following detailed description with reference to the accompanying drawings, in which:

FIG. 1 is a view of an embodiment of the invention with the side plate removed;

FIG. 2 is a front end view of an unloader constructed according to the teachings of this invention;

FIG. 3 is a sectional view as seen along viewing line 3—3 of FIG. 1;

Figure 4:
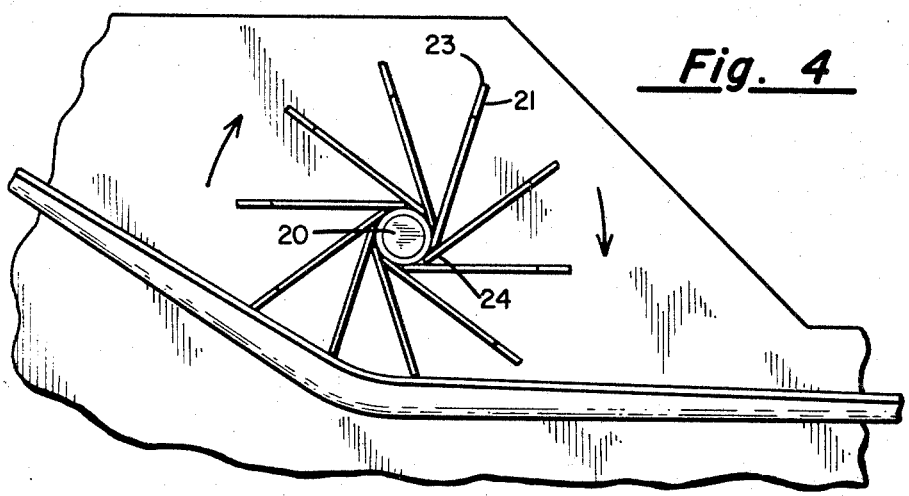
FIG. 4 is a somewhat enlarged section view of a part of the unloader showing details of construction of one form of bladed rotor constituting part of the invention.

An endless belt 10 made of flexible imperforate material which is impervious to the material being handled is driven by a drive roller 11 located at the upper end of the unloader. Drive roller 11 is typically drum shaped and frictionally drives belt 10 by rotating counterclockwise, as viewed in FIG. 1, when driven by a motor, not shown, which is coupled to shaft 12. Tracing the path of belt 10 from the underside of drive roller 11, there is first a lower inclined section or reach 10a, a lower horizontal section or reach 10b, an upper horizontal section or reach 10c and an upper inclined section or reach 10d. The belt is contained within a stiff metal supporting frame 13 having right and lefthand side walls 13a and 13b which rise somewhat above belt 10. The frame in turn is mounted in a convenient fashion on an axle 14 extending between a pair of small diameter wheels 15. The latter arrangement provides easy maneuverability of the unloader when moving it into position for use.

At the juncture of the lower inclined reach 10a and the lower horizontal reach 10b and located between the upper and lower reach of belt 10 is a vaned or bladed idler pulley 16 between the two side walls 13a and 13b rotatably mounted on a shaft connected therebetween. Idler pulley 16 merely assists in guiding the belt from its inclined orientation to its horizontal orientation. Experience has shown that it is best that pulley 16 have blades rather than made as a drum-type roller. This prevents the pulley from binding up due to particles of the granular material falling about. A similar idler pulley 17 is located at the lower front end of the unloader and the belt is wrapped halfway or 180° around the latter pulley to form the upper horizontal reach 10c. The upper horizontal reach 10c joins the upper inclined reach 10d just below vaned or bladed rotor 18. In addition to guiding the belt in its change of direction from horizontal to inclined upward, rotor 18 also assists in pushing the granular material up the inclined portion of of the belt, as will be later described in more detail. Rotor 18 is also free to rotate about a shaft that is connected between the two side walls of the frame 13. The endless belt continues its upward incline and is wrapped halfway around the drive roller 11 and continues in its unending fashion as described heretofore. Of the four pulleys or rollers or the like, only roller 11 is power driven, the others merely being rotated by movement of belt 10.

The shaft 20 of rotor 18 is horizontally mounted between the two side walls 13a and 13b either by being journaled in appropriate bearings in the side walls or in some other convenient fashion. For example, the shaft 20 might be fixedly attached between the side walls and the rotor blades may be attached to a sleeve around the shaft which is free to rotate about the shaft. The blades 21 are made of some suitable stiff sheet material and define a flat plane. At their rear edges the blades 21 are attached such as by welding or the like, off center to the rotatable shaft 20, as most clearly seen in FIG. 4. In other words the blades are tangentially attached so that they extend out from the periphery of shaft 20 rather than radially outward from the center of the shaft. It has been found that this arrangement not only assists in minimizing the build up of granular material between adjacent blades, but also minimizes the loss of material which otherwise occurs when the blades lift out of the material as the rotor continuously rotates.

Figure 5:
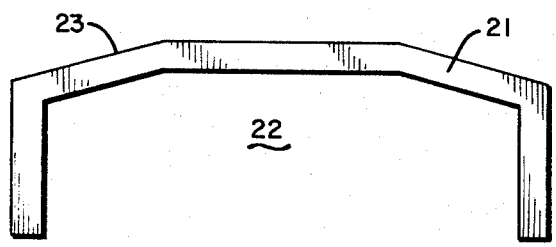
FIG. 5 is a flat projection view of the blade illustrated in the rotor shown in FIG. 4 showing further details of its construction.

As best viewed in FIG. 5, the blades 21 are constructed in frame-like or skelton form having an inner opening 22. In the center area, between the left and right side edges, the outer or front edge 23 of the blades 21 are horizontal and the distance from edge 23 to the axis of shaft 20 is greater than the distance from the axis of shaft 20 to the belt 10. The outer edge of blades 21 taper inward or downward towards the right and left side edges to a dimension substantially equal to the distance from the axis of shaft 20 to the belt 10. In this fashion the rotor blades form the flexible belt 10 into a trough shape. The rotor is constructed and the location and number of blades are chosen so that at all times at least two adjacent blades are in contact with some portion of the belt 10. Forming the belt into the trough shape helps prevent the granular material from falling off the sides of the belt. The movement of belt 10 when driven by the roller 11 causes the rotor 18 to rotate clockwise as viewed in FIG. 4 and the blades 21 thereby assist in forcing the layer of granular material lying on the belt up the upwardly inclined reach of belt 10. Fixedly attached to the inside of side walls 13a and 13b and extending inward while sloping downward therefrom are a pair of support flanges 27a and 27b. These flanges are located underneath the upper reach of belt 10 to help support the belt when it is carrying the granular material being unloaded.

The unloader is operated in the following manner. By pushing down slightly on the upper rear end of the unloader, the front end can be raised enough so that the unloader can be rolled on wheels 15 and positioned so that the forward part of the horizontal reach of belt 10 is located directly beneath of the discharge chute of a grain car or othey type of hopper. The motor, not shown, attached to shaft 12 is then energized to rotate drive roller 11 which in turn drives belt 10 in the manner previously described. The discharge chute of the hopper is opened and the granular material is allowed to fall freely at a suitable rate onto the horizontal reach 10c. As it reaches the location of rotor 18, the outer or front edges of blades 21 swing downward into the layer of granular material and as the blades 21 continue their rotation about shaft 20 they push the granular material up the upper inclined reach 10d of the belt 10. If the depth of the layer of granular material exceeds a prescribed degree, the material starts to spill over the front edge of the blade and pass through the opening 22 in the blade. This prevents material from building up between successive blades which would either push the belt down or jam the shaft 20. Although the fan blades 21 are illustrated in framelike or skeleton form, it is contemplated that they may be more solid but containing a sufficient number of perforations of suitable size to allow the material to pass through to prevent the build up. When the front edge of the blade lifts up out of the layer of granular material, because of the unique arrangement of the blades on the rotor shaft, the material is not propelled upward and outward with a great velocity so little or no material is lost by being thrown out of the unloader. When the material reaches the top of the inclined reach 10d, it is discharged from the unloader. This may be done in any of a variety of fashions. The material may be allowed to just drop off the end into a container or, if desired, the material can be thrown outward from the end into a suitable receptacle. The latter is possible because a single continous belt imparts sufficient velocity to the granular material so that when it reaches the top of the inclined reach of belt 10 it can be propelled a goodly distance of the end. This has been found helpful in some instances.

In an illustrative case, with no limitation intended, the width of the unloader, that is the distance between the side walls 13 and 13b, may be in the order of 18 inches and the belt 10 may be approximately 17 inches wide. The blades on rotor 18 extend outward so that the front edges are approximately 5 inches from the axis of the rotor shaft and the farthest point and taper downward at their side edges to approximately 4 inches. The other two idler pulleys similarly may be in the order of 17 inches wide with their blades extending outward in the order of 1½ inches from the center of their respective shafts. It has been found that a slight taper of the idler pulley blades down to about 1¼ inches at the sides results in a somewhat more reliable operation of the unit.

Figure 6:
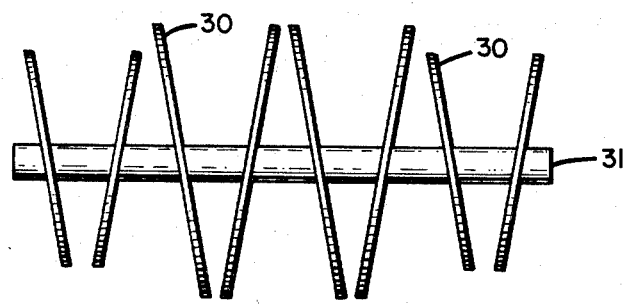
FIG. 6 illustrates the construction of another form of rotor blade constituting part of the invention.

Although the embodiment described heretofore utilizes a rotor blade of the nature shown in FIG. 5, it is contemplated that a variety of different blades can be used. For example, a series of discs mounted and oriented as illustrated in FIG. 6 may be used effectively to provide all of the advantages and features of the invention. Typically the disc blades 30 are attached to the drive shaft 31 and tilted at an angle so that the location of their outer edges projected along the shaft is approximately ½ inch away from their centers. The adjacent blades are leaned in opposite directions as illustrated in FIG. 6 so that as the shaft continuously rotates these blades impel the granular material up the inclined portion of the belt yet the material is unable to build up between the blades. Typically, there are eight discs spaced approximately two inches apart along the shaft and the discs located along the central portion of the shaft are in the order of ten inch diameter and those located near the left and right ends of the shaft are in the order of 8 inch diameter. This provides the trough shape to the belt in the same fashion as the skeleton type tapered blades described earlier.

I claim:
1. An unloader for hoppers carrying granular material and the like, comprising: a continuous elongated flexible conveyor belt having an upper horizontal reach, a lower horizontal reach, an upper inclined reach and a lower inclined reach; said belt located within a supporting frame having parallel rigid side walls; the horizontal reach of said belt adapted to be located at least part way under the discharge chute of a hopper for receiving granular material being discharged by the hopper; a drive roller located between the upper and lower inclined reaches at one end of said belt; said roller being journaled between the side walls of the frame for continuously driving the belt in a direction to transport the granular material along the upper horizontal reach and along the upper inclined reach; a guiding idler pulley located between and in contact with the upper and lower horizontal reaches at the other end of said belt and journaled between said frame side walls; a second guiding idler pulley journaled between said frame side walls in contact with the lower reach of the belt where the lower horizontal and inclined reaches meet; and a rotor located above the upper reach of the belt where the upper horizontal and inclined reaches meet, said rotor comprising a shaft journaled between the frame side walls and a plurality of spaced fan blades extending outward from said shaft a distance greater than the distance between the shaft and the upper reach of the belt whereby the outer edges of said blades press onto said belt, said fan blades being tapered radially inward at the ends of said shaft to form the belt into a trough shape.

2. The unloader as described in claim 1 wherein the side walls of the frame along the horizontal reach of the belt have flanges extending inward and sloping downward under the upper horizontal reach of the belt for at least in part supporting the belt.

3. The unloader as in claim 2 wherein said rotor blades are constructed of stiff plate material for pushing the granular material along the belt, said blades containing openings located inward from their outer edges to allow passage of some of the granular material therethrough.

4. The unloader as in claim 3 wherein each of said rotor blades defines a plane and each of said blades is attached tangentially to the shaft.

5. The unloader as in claim 2 wherein said rotor blades are discs of rigid material, said discs being centrally attached in spaced apart relationship to said shaft.

6. The unloader as in claim 5 wherein the blades are mounted on said shaft other than perpendicular to the shaft axis.

7. The unloader as in claim 6 wherein adjacent blades are mounted on said shaft at different angles.

References Cited

UNITED STATES PATENTS

| | | | |
|---|---|---|---|
| 999,419 | 8/1911 | Van Wert | 198—191 |
| 2,539,022 | 1/1951 | Kreider | 198—167 |
| 2,812,052 | 11/1957 | Doyer | 198—128 |

EVON C. BLUNK, *Primary Examiner.*

R. J. HICKEY, *Assistant Examiner.*